US008190556B2

(12) United States Patent
Pappas (10) Patent No.: US 8,190,556 B2
(45) Date of Patent: May 29, 2012

(54) INTELLEGENT DATA SEARCH ENGINE

(76) Inventor: Derek Edwin Pappas, Palo Alto, CA (US)

( * ) Notice: Subject to any disclaimer, the term of this patent is extended or adjusted under 35 U.S.C. 154(b) by 14 days.

(21) Appl. No.: 12/555,083

(22) Filed: Sep. 8, 2009

(65) Prior Publication Data

US 2009/0327249 A1    Dec. 31, 2009

Related U.S. Application Data

(63) Continuation of application No. 11/467,157, filed on Aug. 24, 2006, now abandoned.

(51) Int. Cl.
*G06F 17/00* (2006.01)
(52) U.S. Cl. ............... 707/602; 707/709; 707/736
(58) Field of Classification Search .......... 1/1; 707/706, 707/709, 710, 736, 602
See application file for complete search history.

(56) References Cited

U.S. PATENT DOCUMENTS

| | | | | |
|---|---|---|---|---|
| 5,954,798 | A * | 9/1999 | Shelton et al. ............ | 709/224 |
| 6,035,332 | A * | 3/2000 | Ingrassia et al. .......... | 709/224 |
| 7,505,984 | B1 * | 3/2009 | Nevill-Manning et al. ........... | 1/1 |
| 8,090,678 | B1 * | 1/2012 | Glickman et al. ............ | 707/602 |
| 2003/0172075 | A1 * | 9/2003 | Reisman .................... | 707/10 |
| 2005/0022115 | A1 * | 1/2005 | Baumgartner et al. ........ | 715/513 |
| 2005/0102270 | A1 * | 5/2005 | Risvik et al. .............. | 707/2 |
| 2006/0129446 | A1 * | 6/2006 | Ruhl et al. ................ | 705/10 |
| 2007/0038663 | A1 * | 2/2007 | Colando ................... | 707/102 |
| 2007/0168382 | A1 * | 7/2007 | Tillberg et al. ........... | 707/102 |
| 2007/0214140 | A1 * | 9/2007 | Dom et al. ................ | 707/7 |
| 2008/0010291 | A1 * | 1/2008 | Poola et al. .............. | 707/10 |
| 2008/0033996 | A1 * | 2/2008 | Kesari .................... | 707/104.1 |

* cited by examiner

*Primary Examiner* — Dennis Truong
(74) *Attorney, Agent, or Firm* — Terra Law LLP; Benedict O'Mahoney (57) ABSTRACT

Automatically extracting information that matches a predetermined criterion from one or more web pages at one or more web sites and automatically producing one or more extracted data-field names from the information extracted from the one or more web pages at the one or more web sites. The extracted information includes at least one extracted data-field value associated with one of the one or more extracted data-field names. If one of the extracted data-field names matches an existing data-field name in a previously constructed data base including one or more data fields each associated with a data-field name and a data-field value, the method updates an extracted data-field value associated with the data-field name in the data base. If one of the extracted data field names does not match any of the existing data-field names in the data base, the method adds the extracted data-field name to the data base.

17 Claims, 3 Drawing Sheets

INTELLIGENT DATA SEARCH ENGINE

CROSS-REFERENCE TO RELATED APPLICATIONS

This patent application claims priority under 35 U.S.C. 120 as a continuation of U.S. patent application Ser. No. 11/467,157, entitled INTELLEGENT DATA SEARCH ENGINE, filed on Aug. 24, 2006 now abandoned, the entire contents of which are hereby incorporated by reference.

BACKGROUND

The present disclosure relates to data search technologies.

The current user of a web-based search engine creates a search engine query by typing in one or more words in a dialog box at a search. The current user of a web-based search engine creates a search engine query by typing in one or more words in a dialog box at a search engine's web page. The search engine returns a list of web addresses (URL list). The web addresses in the list returned by the search engine are ranked by their popularity by some search engines. The user must click on each link to examine contents of each page to find what the user is looking for. This process can be quite time consuming for the user because many of the pages in the list of web addresses may not contain what the user was searching for. In effect each of the pages in the URL list returned by the search engine is manually searched and or examined by the user. Either the user reads the summary of the page and discards the link or the user clicks on the link and reads the contents of the page. If there are further interesting links on the page then the user will follow the links to other pages. Even at the web addresses that may contain some information the user is searching for, the information may be buried in a lot of other unrelated information. The user generally has to spend a lot of time sorting through miscellaneous information to look for information. There is therefore a need for providing an efficient method to help users to search and find information. If a more accurate database can be built from web pages using a more accurate and complete extraction process then the user will have access to a database with more complete and accurate information.

SUMMARY

In a general aspect, the present invention relates to a method, including automatically extracting, from one or more web pages at one or more web sites, information that matches a predetermined criterion; automatically producing one or more extracted data-field names from the information extracted from the one or more web pages at the one or more web sites, wherein the extracted information comprises at least one extracted data-field value associated with one of the one or more extracted data-field names; if one of the extracted data-field names matches an existing data-field name in a previously constructed data base comprising one or more data fields each associated with a data-field name and a data-field value, updating an extracted data-field value associated with the data-field name in the data base; and if one of the extracted data field names does not match any of the existing data-field names in the data base, adding the extracted data-field name to the data base.

In another general aspect, the present invention relates to a method, including automatically extracting, from one or more web pages at one or more web sites, information that matches a predetermined criterion, wherein the predetermined criterion comprises one or more of a category name, a data-field name in a previously constructed data base, a company name, a product name, a taxonomy entry, a synonym entry, or a pattern of expressions, wherein the data base comprises one or more data fields each associated with a data-field name and a data-field value; automatically producing one or more extracted data-field names from the information extracted from the one or more web pages at the one or more web sites, wherein the extracted information comprises at least one extracted data-field value associated with one of the one or more extracted data-field names; if one of the extracted data-field names matches an existing data-field name in the data base, updating an extracted data-field value associated with the data-field name in the data base; and if one of the extracted data field names does not match any of the existing data-field names in the data base, adding the extracted data-field name to the data base and writing an extracted data-field value associated with the extracted data-field name to the data base.

In yet another general aspect, the present invention relates to a method, including: automatically constructing the data base comprising a plurality of categories each defined by a category name, wherein each of plurality of categories is associated with a plurality of data fields in the category, wherein each data field is associated with a data-field name and a data-field value; automatically extracting, from one or more web pages at one or more web sites, information that matches a predetermined criterion; automatically producing one or more extracted data-field names from the information extracted from the one or more web pages at the one or more web sites, wherein the extracted information comprises at least one extracted data-field value associated with one of the one or more extracted data-field names; if one of the extracted data-field names matches an existing data-field name in the data base, updating an extracted data-field value associated with the data-field name in the data base; if one of the extracted data field names does not match any of the existing data-field names in the data base, adding the extracted data-field name to the data base and writing an extracted data-field value associated with the extracted data-field name to the data base; and extracting information from a web page at a web site using the extracted data-field name.

The method can further include constructing the data base comprising a plurality of categories each defined by a category name, wherein each of plurality of categories is associated with a plurality of data fields in the category, wherein each data field is associated with a data-field name and a data-field value. The one or more data field names in the previously constructed data base can be produced using information extracted from a web site. The predetermined criterion can include one or more of a category name or a data-field name in the data base, a company name, a product name, a taxonomy entry, a synonym entry, or a pattern of expressions. The method can further include if one of the extracted data field does not match any of the existing data-field names in the data base, writing an extracted data-field value associated with the extracted data-field name to the data base. The extracted information can include text, alphanumeric characters, or symbols. The step of automatically producing one or more extracted data-field names can include conducting morphological analysis on the text, alphanumeric characters, or symbols in the information extracted from the one or more web pages at the one or more web sites. The step of conducting morphological analysis can include one or more of parsing the text, the alphanumeric characters, or the symbols, and matching the text, alphanumeric characters, or symbols with one or more data-field names in the database. The step of conducting morphological analysis can include producing a list of words from the extracted information; and matching one or more words in the list of words with at least one of the one or more data-field names in the data base. The step of conducting morphological analysis can include assigning weights to the text, alphanumeric characters, or symbols that are in a pre-determined proximity; identifying the text, alphanumeric characters, or symbols that are in the pre-determined proximity; and extracting the data-field names from the text, alphanumeric characters, or symbols that are in the pre-determined proximity in accordance with the weight of the pre-determined proximity. The step of conducting morphological analysis can include parsing the text, the alphanumeric characters, or the symbols into one or more tokens each including a sequence of the text, the alphanumeric characters, or the symbols; comparing the tokens parsed from the text, the alphanumeric characters, or the symbols extracted from the information extracted from the one or more web pages; and producing one or more extracted data-field names in accordance with tokens that are common to the information extracted from the one or more web page at the same web site. The information from the one or more web pages at the one or more web sites can be expressed in one or more of hypertext markup language, PDF file, Microsoft Word, Javascript, flash, or XML. The method can further include representing the information extracted from one of the one or more web pages at one of the web sites by a data structure; and comparing data structures representing different web pages of the web site to produce the one or more extracted data-field names. The step of comparing data structures can include identifying information that is common in data structures representing different web pages at the web site. The step of comparing data structures can include producing an intersection between the data structures representing different web pages of the web site to produce an extracted data-field name. The step of producing an intersection can include expressing the information extracted from one of the one or more web pages by a plurality of data vectors each comprising a sequence of symbols; identifying the common segments of symbols between the data vectors; and producing an intersection vector for the identified common segments of symbols. The step of identifying the common segments can include identifying segments of symbols that have the same sequences in the different data vectors. The data structure can include one or more data-field names in the data base. The data structure can include one or more of a tree structure, a vector structure, or an object model. The step of updating the extracted data field associated with the data-field name in the data base can include aggregating the data-field values extracted from the web pages at a plurality of data fields in the data base. The method can further include extracting information from a web page at a web site using the extracted data-field name added to the data base.

Embodiments may include one or more of the following advantages. The disclosed system and methods provide efficient solutions to users' information searches. Data from a plurality of web sites are extracted and organized in a relational database. The searches over the relational data base can save a user's time and effort sorting and filtering the search results as compared to other search engines. The search engine disclosed in the present specification extracts correct information and stores the correct information in an aggregate database where the information can then be retrieved more easily by a user. The user can further manipulate the relevant search results using automatic sorting and filtering. Furthermore, the user can search within the returned results using the built-in query mechanism of the relational database. The disclosed system and method represent an improvement in comparison with conventional search engines. Some conventional search engines work as voting machines that gather links and calculate the relative popularity of the links and return answers to user queries based on the popularity of the links. The user queries are answered with pages of links which the user can spend a lot of time to sort through manually. Some other conventional search engines extract information and build aggregate databases that are not complete and contain many errors.

Another advantage of the disclosed system and methods is the improved quality in the search results. The disclosed intelligent search engine returns pre-organized and relevant information that are organized and sorted by database records (DBR) field names. The conventional search technologies, in contrast, typically return a list of web addresses that may or may not contain relevant search information. The results are often inaccurate, incomplete, and frequently biased by paid inclusion.

Another advantage of the disclosed system and methods is the automatic creation of the relational database encompassing a plurality of web sites. The present specification provides a novel method to reverse engineer databases on the Internet. An example of an Internet database is an HTML database. The search engine crawls different web sites and finds, extracts, and normalizes HTML content. The data from different web sites is extracted and normalized and then combined to build an aggregate database. The aggregate database contains DBRs from many different sites. The aggregate database offers a user essentially instant access to desired information. The disclosed search engine therefore provides a more efficient extraction process, and a more comprehensive and accurate aggregate database. The crawler process also offers a higher quality extraction than conventional search engines measured by the lower error rate per page extracted.

Furthermore, the lower error rate during the extraction process in the disclosed system and methods increases the probability of finding relevant sites and information in response to search keywords. A more complete and accurate database is represented by a class of schemas. The probability of finding useful sites in response to search keywords is significantly greater. Moreover, because the database contains more complete information about the schema such as numeric information which describe the database elements (e.g. the size of the object) searches can be conducted using general descriptions of the items (e.g. search for a microwave oven which is within a certain dimension range). Conventional search engine technologies, by contrast, return results that require the user to manually validate, sort, and filter the search results. In the case of conventional search engines that return links based on popularity, the user must search through the list of links and find relevant web pages Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The following drawings, which are incorporated in and form a part of the specification, illustrate embodiments of the present invention and, together with the description, serve to explain the principles of the invention.

DETAILED DESCRIPTION

The present specification addresses the drawbacks of the conventional search engines by analyzing data from different web sites which contain content generated by a database report generator. Examples of sites which contain content generated by a database report generator include commercial shopping or vertical channels such as automobiles, real estate, and job search. Relevant data is extracted from these web sites. The extracted data is organized and aggregated in a database. Users will obtain better search results from the search engine described in this patent than in other search engines. The search engine described in this patent has a more comprehensive aggregated database or schema with a lower error rate per database record (DBR). The aggregate database or schema is constructed from automatically generated databases or schemas found on the web. The user can also manipulate the search results using automatic sorting and filtering. Furthermore, the user can refine the searches within the returned results using the built-in query mechanism of the database.

Figure 1:
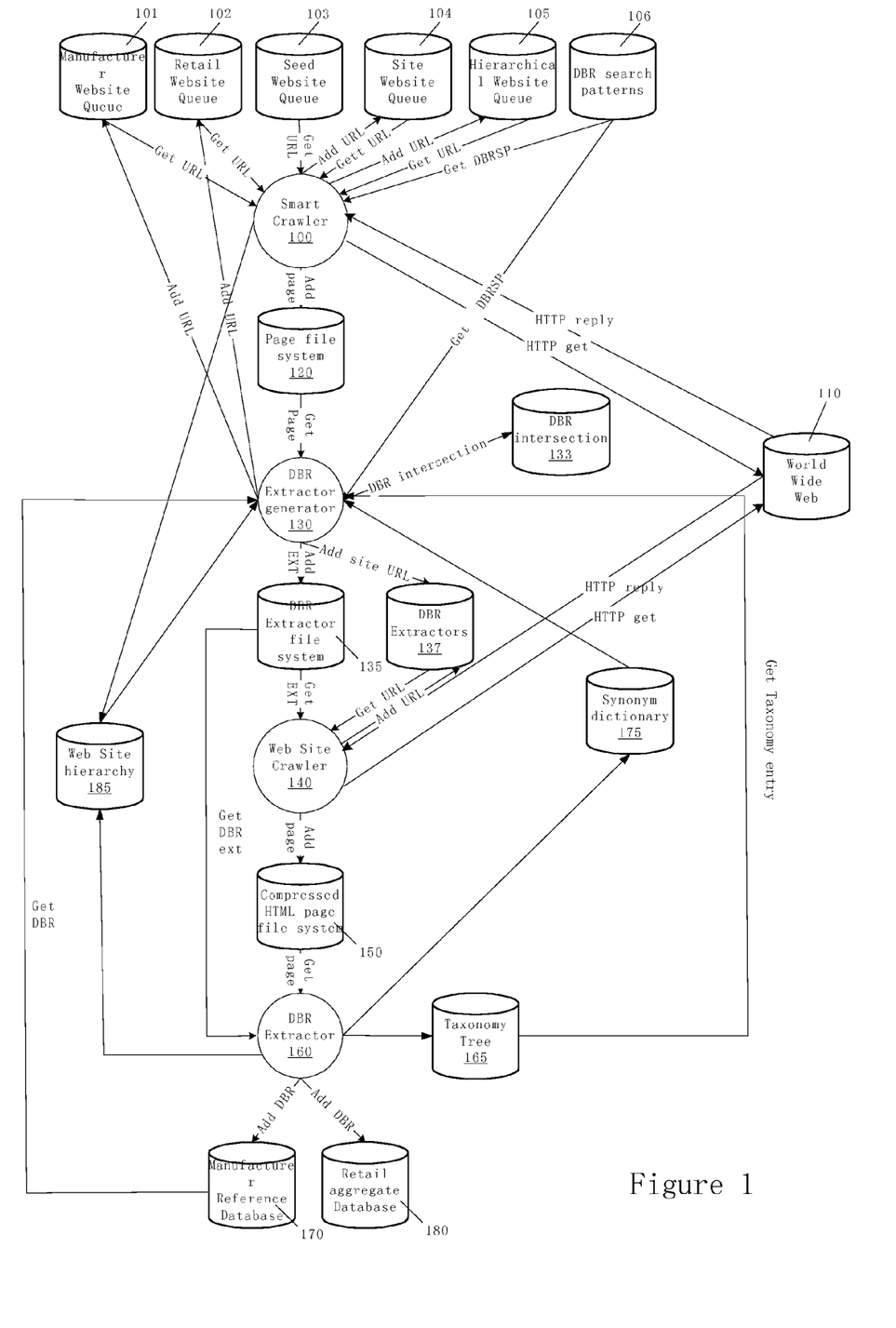
FIG. 1 is a schematic diagram for the search engine data structures and the processes in accordance with one implementation of the present specification.

FIG. 1 is a flow and block diagram for the data structures and processes in accordance with the present specification. The process includes the following steps. URL's are stored in a plurality of universal resource link (URL) queues such as 101-105. Each queue stores different type of web site on the World Wide Web (WWW) 110. An algorithmic smart crawler stores URL's in queues 101, 102, 103, and 104. URL queue 101 is a queue for manufacturers' web sites. The URL queue 102 stores web addresses for retailers' web sites. A seed web queue 103 is initialized with the seed web addresses from a file. A site web queue 104 stores the root (top level) web addresses for new web sites which are discovered by the smart crawler. A set of hierarchical web queues 105 each store a set of web addresses for each web site to be used during the hierarchical traversal of that specific site. A smart crawler 100 algorithm selects a URL queues 101-105 based on a priority select algorithm.

The smart crawler 100 can send a request to one of the URL queues 101-105 for a URL for a web site. The smart crawler 100 receives a URL from the URL queue and issues a HTTP (Hypertext Transfer Protocol) request for the web page at the received URL. The request can also be in other formats or languages such as PDF file, Microsoft Word, Javascript, Flash, and XML. The smart crawler 100 receives the contents of the web page in a HTTP reply, typically in HTML. The smart crawler 100 analyzes the page and computes the DBR probability. A smart crawler 100 algorithm then gathers content from the selected URL and saves the content in the page file system 120.

Although an example chosen to illustrate the aggregate database creation process is a shopping database creation process, it is understood that other automatically generated schema on the web can also be extracted using this process.

The search engine administrator optionally can create a seed list of DBR search patterns 106 which contain the markers, DBR field names, the symbols, and the regular expressions that the search engine should find. For example, the DBR search pattern for a product search can include company name, model name, model number, price, size, color, and other DBR field names. Markers can include a shopping cart and aliases for a shopping cart such as a shopping bag. Each of the elements in the DBR search pattern can be assigned a weight which represents the relative importance of that element to the other elements in the pattern.

Next, the probability that a page contains one or more patterns (DBR's) is calculated. In one implementation, the DBR probability for a candidate page can be calculated using the weighted sum of the page. For example, the weighted sum of the page can be determined by multiplying the weight of the DBR field times 1 or 0. If the DBR field is present on the page, the field weight is multiplied times 1 else if the field is not present on the page the field weight is multiplied times 0.

One type of proximity search algorithm finds the high probability matches (e.g. constant strings or markers) on pages and searches for the pattern matches (e.g. regular expressions, proper names) and measures the relative distance from the high probability token matches to the lower probability matches. The distance is the number of rendered tokens (the words which actually appear on the rendered HTML page). The weight of the lower probability matches is then multiplied times the inverse of the distance from the high probability item.

The probability number for a page can also be calculated by finding all of the tokens which match similar tokens on other pages (the intersection of the pages) from the same site. The number of tokens present on each page that are present on other pages is divided by the maximum number of intersecting tokens on all pages being compared to normalize the probability number. The normalized number is the page probability. It is understood that there are many implementations of probability analysis for web pages and they are not described here. If the DBR probability of the candidate page is above a predetermined threshold, the compressed page is added to the specific DBR candidate page list (CPL) in the page file system 120. The compressed page can be produced by compressing text in the page using text compression methods such as zip or a B tree file system. The page file system 120 can include software based memory resident caches to reduce the amount of time to fetch pages on a computer storage. Pages may be pre-fetched from the web site(s) currently being crawled.

In the present specification, the term "manufacturer's web site", refers to a web site which is created and maintained by a single manufacturer of products. Manufacturer's web sites contain accurate information about a manufacturer's products. The DBR information extracted from the manufacturer's web site contains the correct information on the list price, model number, model name, description, and other details. The information on manufacturer's web sites usually contains product information derived from the manufacturer product database. The DBRs in the HTML on the manufacturer's web sites usually contain the most accurate information on the WWW 110 about a product.

Moreover, most manufacturer web sites contain a list of resellers and/or authorized dealers. Moreover, links to the dealers and/or authorized resellers are more often than not present on the manufacturer's web sites. Links to the dealers and/or authorized resellers have a high probability that the search engine can find the manufacturer's products at those web sites. In fact the links at these web sites sometimes point directly to the manufacturer's products which are for sale. The search engine can extract accurate DBR information at the manufacturer's web site as well as links to retail and wholesale URL's which carry the manufacturer's products. The manufacturer's network of dealers can be discovered by the search engine on the manufacturer's web site. Each of the web sites in the dealer network can then be crawled and the pricing and other information specific to the manufacturer's products can be extracted and added to the aggregate database.

A web site which contains a reference database (manufacturer's web site) contains DBRs which are found on other sites (retail shopping sites). The product information and the links to the dealers and/or authorized resellers on the reference/manufacturer's web sites are considered to be the most accurate reference for the manufacturer's products and can be used to assist in finding retail sites which carry the products and in the extraction of DBRs from retail/wholesale shopping sites. Some products which are store brands will not be present at a manufacturer's web site (e.g. in house brands).

In the present specification, the term "retail web site" or "retail shopping web site" refers to a web site that contains the product information from a plurality of manufacturers in a database record format. Retail web sites offer products for sale which are purchased by consumers. Consumers search different retail web sites for the best price, delivery, lowest shipping cost, and other benefits. Retail web sites contain DBRs. The DBRs on different retail web sites may contain the same product name, model number and the same or different prices. Moreover, different retail web sites may contain the same product but in different colors or sizes. Additionally retail web sites may have other differentiating factors such as delivery time, return policies, and shipping costs. The search engine attempts to find the delivery time, return policies, and shipping cost information and add it to the DBR for the site in the aggregate database. This information is used to present a total picture to the consumer when they search for an item via the search engine web interface.

DBRs in most cases can be found on manufacturers web sites. If a retail web site contains DBRs for a manufacturer which has not been discovered yet, then the manufacturer's web site is added to the URL queue 101 for manufacturers' web sites. Retail web sites may contain incomplete and, or incorrect DBR information (not all information in the manufacturer's DBR for specific items may be present in the retail DBR). Moreover, additional information in the DBR's at the retail site is associated with the DBR's at the manufacturer's site such as the selling price of the item are extracted and added to the retail database 180. The additional information (e.g. site selling price) is captured and sent to the retail database 180 where it is added to the DBR for that product or database record.

A manufacturer reference database 170 is created from data found at manufacturer's web sites. The search engine will find a majority of the reference data at the manufacturer web sites. The reference database can include HTML databases for a manufacture's web site, retail web site (house brands), or wholesale shopping web sites (created from OEM product). For example, the manufacturer reference database 170 can include information about the current products that have been found on the retail web sites. Data stored on the manufacturer reference database 170 serve as a frame of reference.

Websites on the WWW 110 are crawled and different types of the HTML databases are identified. The DBR information from the web sites is added to the corresponding database. The web pages containing DBR characteristics are identified either using a set of keywords, symbols, or markers or by matching some of the symbols in the DBR search pattern (106). For example, a dollar sign next to numeric characters could indicate a price or alphanumeric text could indicate a model name. The sets of DBR's at the web sites are unique to each web site. Each web page is assigned a unique code to identify the page as a member of the candidate page list CPL to be stored in the page file system 120.

A DBR extractor generator 130 next analyzes data from a set of pages for a specific web site stored in the page file system 120. The extractor generator 130 makes a request for and receives a set of compressed pages, from a specific web site, from the page file system 120. The extractor generator 130 decompresses the pages and analyzes the pages by structurally comparing the pages. If the content on the pages matches a DBR search template, the extractor generator 130 generates an extractor specific to the web site and the DBR format. The extractor generator 130 stores the extractor in association with the web site in an extractor file system 135. The URLs and the site names of the web site associated extractors are also categorized by their associated extractors and stored in an extractor's URL queue 137.

The web site crawler 140 selects the URL or the name of a web site from the extractor's URL queue 137. The web sites can include manufacturers' and retailers' sites. The web site crawler 140 then traverses the web site starting at the URL and parses each page found at the site. Key words (e.g. products) on the web pages are identified and the web links are followed to pages that may or may not contain additional parts of the DBR. In many web sites over the internet, HTML DBRs are stored in HTML format on the web.

The HTML codes acquired from the traversal of these web sites can be recorded in a vector or a tree data structure or other data structure to represent the web pages. Structural similarity comparison of the data structures identifies the key words, symbols, and markers and database record fields and field names and the relationships between the DBR field names, DBR fields, key words, symbols, and markers in each of the data structures which are being compared (the intersection between the pages). In one implementation, a technique called structural intersection helps to identify the DBRs present in the data structures. The order of the DBR fields and markers in the data structure is identified. A computable representation of the intersection of the data structures is created. The intersection data structure is used to generate an extractor for a specific page type that the intersection data structure represents.

Two or more vectors can be compared to find similar relative positioning or HTML tags. HTML tags with the same relative positioning in pages/vectors are tagged with meta-tags to indicate that the tags are in the same relative position as other tags on other pages. The text contained next to the relative markers is analyzed to find DBR field names and DBR fields. The text contained next to the DBR field names is analyzed to find the DBR fields. Database record field names need not be present in the HTML DBR that is being analyzed. Morphological analysis is used to identify the DBR field names and the DBR fields in the text strings in DBR's on the web pages. The morphological analysis includes dictionary lookups which determines the boundaries of the fields in the strings. The dictionary is constructed from the proper names which are entered into the manufacturer reference database 170 the sub-strings in the strings can be reordered and are categorized or associated with an existing database and DBR field name. If the DBR field name is not present in the sub-string, the contents of the DBR fields in the sub-string are looked up in the manufacturer reference database 170 and the DBR field is tagged with the associated DBR field name from the manufacturer reference database 170. This information is included in the DBR extractor which is stored in the manufacturer reference database 170 that is created during the analysis phase by the DBR extractor generator 130. The DBR field order is identified during the operations of the DBR extractor generator 130. The relative DBR field order specifies the relative order of the DBR fields that will be extracted during the DBR extraction phase. However, the determination of the exact position of each field in each DBR record is determined during the extraction phase. The relative DBR field ordering is used by the extraction phase to reduce the amount of analysis that is performed on the text which contains the DBR fields.

The morphological analysis uses the DBR field ordering identified in the extractor generation step to assist in the segmentation identification process. The morphological analysis step searches for structurally similar sub-strings to find the exact DBR field segmentation. The segmented word list is divided into DBR field names if present, DBR fields, and don't care strings. The DBR fields are looked up in the manufacturer reference database 170. If the DBR field is found in the manufacturer reference database 170 then the DBR is added to the retail aggregate database 180. If the DBR is not found in the manufacturer reference database 170 then the DBR is added to the manufacturer reference database 170 and retail aggregate database 180. Another process adds new DBRs to the manufacturer reference database 170. For each new manufacturer reference database, the search engine has to make an attempt to find the corresponding manufacturer web site and the corresponding manufacturer database record on that web site. If the manufacturer's web site has not been processed before then the web site is processed and added to the manufacturer reference database 170. Some retail DBRs do not have a corresponding manufacturer DBR on the WWW 110.

Intra site URL links in the page can be added to an intra-site queue. The inter-site URL links can be added to the seed URL queue 103. The seed URL queue 103 can be implemented as a standard first-in-first-out (FIFO) data structure that exists in memory or on disk. Each parsed page is analyzed with a page probability check. If DBR page probability of a parsed web page is above a programmable threshold, the web page is compressed and stored in the compressed pages file system 150.

A DBR extractor 160 receives a web page from the compressed pages file system 150. The web page is decompressed. The DBR extractor associated with the DBR web page(s) is retrieved from the DBR extractor file system 135. The DBR extractor 160 extracts the DBR(s) from the web page(s). The DBR(s) is stored in the manufacturer reference database 170 or retail aggregate database 180. The web page(s) is analyzed for any new taxonomical entries and the web site hierarchy 185 is updated.

If a new taxonomical entry is found, it is added to the taxonomy tree 165 (or taxonomy graph). The taxonomy tree 165 is used by the DBR extractor generator 130 to create the DBR extractor. A tree data structure (minimum spanning tree-MST) is used in subsequent analysis steps and is used to create the taxonomy tree 165. The manufacturer typically breaks the products into categories. The categories are added to a manufacturer reference database 170 or a retail aggregate database 180. The categories are added to the taxonomy tree 165 and the synonym dictionary 175. Each of the taxonomy categories contains the fields in the seed DBR. As data is found that matches the category, it is matched to the current DBR field names and fields. If the site DBR contains new DBR field names and fields then the new DBR field names and fields are added to the manufacturer reference database 170 or the retail aggregate database 180.

The DBR extractor 160 can also include a morphological analysis engine. During the DBR extraction phase at a specific site the contents of the web page are parsed, converted into a data structure, the associated DBR extractor is retrieved, the page is structurally and morphologically analyzed by the associated DBR extractor, and relevant DBR data is extracted from the page. The extracted data is then inserted into the manufacturer reference database 170 or the retail aggregate database 180. The search engine DBR extractor uses a morphology engine, taxonomy tree, synonym dictionary and manufacturer reference database 170 to normalize the extracted DBR field names and the DBR fields. The normalized data is stored in a single manufacturer reference database 170 or the retail aggregate database 180. Once the DBR has been added to the manufacturer reference database 170 or the retail aggregate database 180, the web page needs to be periodically revisited to see if any DBR information has changed on the page.

The search engine operation is controlled by a search engine administrator who initializes the URL seed queue to start the search. The list of URL's is stored in a file. The file is loaded into the URL seed queue. The URL is added to the file based on experience with respect to the set of URL's that gives the best web coverage. Web coverage is measured by the percentage of WWW web pages visited and the quality of the data extracted from the pages. Quality is measured in terms of the number of errors per DBR extracted. Errors include the number of incorrectly identified DBR field names and incorrectly segmented DBR fields. The search engine administrator also optionally selects or supplies a set of DBR search template guides. A DBR search template guide is a formal description of a DBR. The DBR search template guide is used by the search engine to identify the web sites to extract DBR's from. The DBR search template selected or supplied by the search engine administrator is used as a general guide by the search engine to identify pages which contain DBR(s) which belong to a certain DBR class. The template is not used to create the DBR extractor.

An example of the use of the manufacturer reference database 170 or retail aggregate database 180 is now described. A user can query the manufacturer reference database 170 or retail aggregate database 180 using synonyms defined in the synonym dictionary 175. If a user is searching for "used Benz", synonyms might include "used" and "pre-owned", "Mercedes" and "Benz" and "Daimler". The search engine database contains normalized car data; "Benz" is normalized to "Mercedes". Because the data is normalized and then aggregated, the search engine presents results that are more complete and accurate than the results returned by other shopping or traditional search engines.

The search results can be presented to the user in several different formats, including a list, a thumbnail view, a spreadsheet or table, a DBR(s), and a user-defined format. The user can also elect to display a table which compares different products based on criteria.

A user can search the manufacturer reference database 170 or the retail aggregate database 180 via a web interface. The users can also build custom queries using programming/scripting language provided by the search engine, which can be saved for use later. The search engine allows users log into the search engine to build up a user profile. Users can use the search engine to create their own vertical search pages for specific product categories. The user will register the pages on the search engine site so that other users can use the custom vertical search pages.

The manufacturer reference database 170 and the retail aggregate database 180 can be automatically updated. If the data is presented in a spreadsheet format the first row (header row) may contain the database field names which can be inferred from the words in the header row. Moreover, if the spreadsheet is repeated on many different pages on the sites with a header row that contains the database field's names repeated on the many different pages then the field names can be inferred.

The search engine adds the fields in the manufacturer reference database 170 or the retail aggregate database 180. The same word/field name is used in a structurally similar position in the page/segmented string. DBR's are compared. If the DBR's contain the same words in the same positions in each structurally similar potion in each page then the "same words" can be looked up in the manufacturer reference database. One or more of the "same words" should appear in the manufacturer reference database. Alternatively, the field name may be a synonym of an existing field name in the manufacturer reference database.

The field names on the web pages may be different from the names in the search engine database. The tool will normalize the keywords to the normalized set of database keywords. The database field names and the data extracted from different sites will not have the same format as all other sites. The data is then converted into a normalized format.

Other types of databases can be extracted from the WWW 110 using the extractor generation method. Information on one web site can be used to find data on other web sites. Other examples of an aggregate database—include creation of a resume database that has links to a patent database and a database including technical papers authored by the individual listed on the resume. The resume database can include keywords to categorize the person's areas of expertise. The resume database can also validate that the person indeed attended a college or a university. A resume can contain a list of papers, patents and projects that someone has worked on. This information is added to the person's DBR. The information in the person's DBR can be used to find additional information about that person if the form of associations with other individuals.

The above described system and methods alleviate the need for a user to sort through a large number of often irrelevant web links in the search results provided by the conventional search engines. The above described system and methods can also significantly improve the specialized search engines at conventional retail shopping web sites by returning more complete, more accurate results without duplication. Related items can also be associated by database records. Moreover, data which is related but on different pages can be aggregated and viewed in one central location.

Data in the search engine may be accessed via a web interface on a desktop or laptop computer or via a mobile/cell phone using a call back system, SMS, or a web browser. Information about products may be looked up in the database by name, product description, product category, metric (e.g. shoe size), model number, price, and/or UPC number. Other lookup methods may also be used. Mobile product search can be performed using a connection to the database server. A UPC code may be transmitted to the database server and current pricing at web sites and local stores, availability at stores near the user's current location, and other relevant information may be transmitted back to the user.

Users may build communities at the shopping site where they can exchange information about products, prices, deals, coupons, product recommendations, and other consumer related information.

Figure 2:
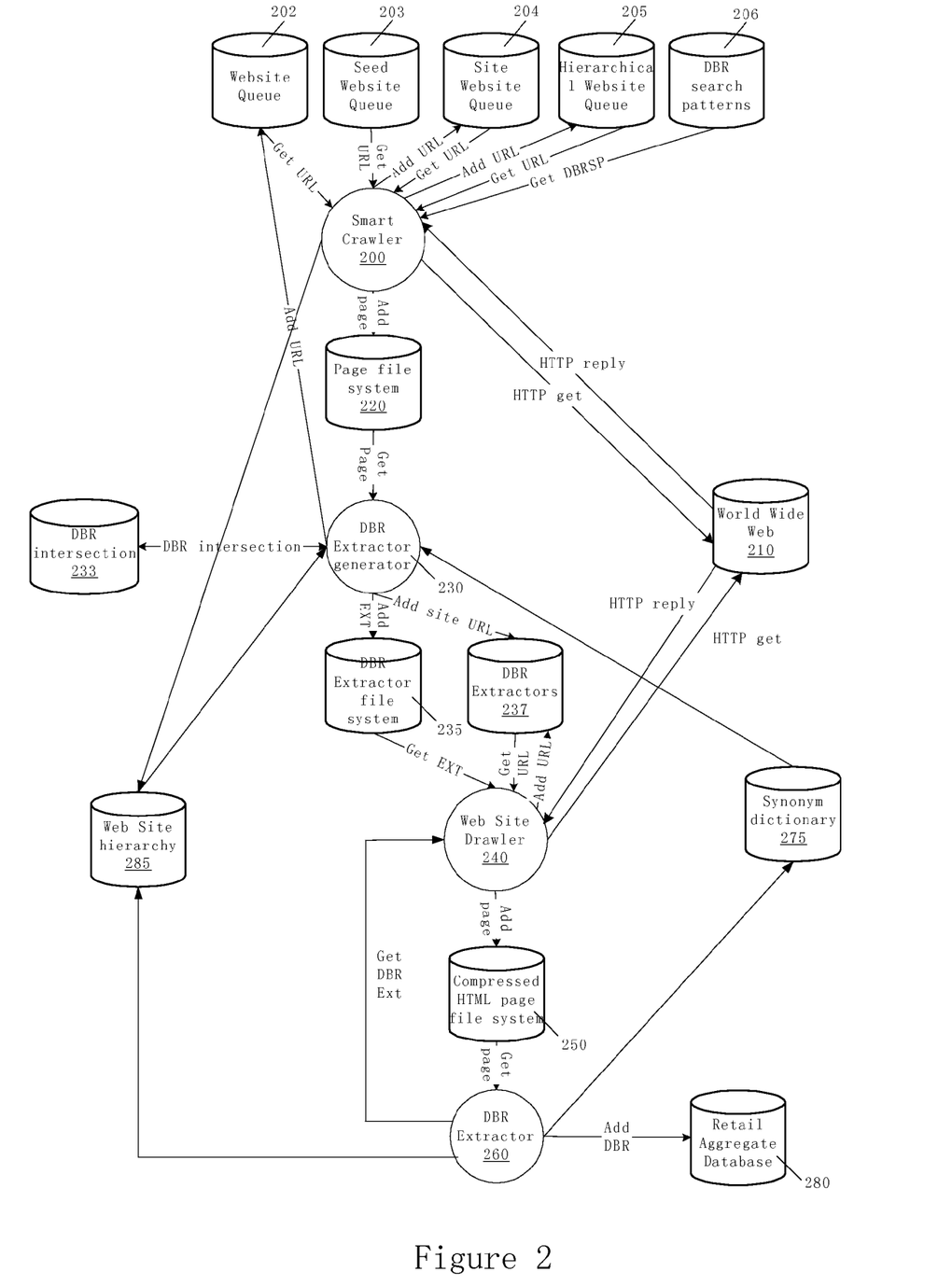
FIG. 2 is a schematic diagram for the search engine data structures and the processes in accordance with another implementation of the present specification.

FIG. 2 is a schematic diagram for the search engine data structures and the processes in accordance with another implementation of the present specification, which illustrates an automatically generated replicated schema for producing and updating a retail aggregate database 280.

Different from the schema shown in FIG. 1, a website crawler 240 can directly crawl World Wide Web (WWW) 210 to allow automatic extraction and update of content from different websites. Sets of pages at different web sites can be automatically generated by a schema generator such as a database report generator. A sample set of web pages (220) at that web site can be extracted. The characteristics that match the schema being searched for can be identified by computing the probability that the page has one or more groups of words which match the schema. The data intersection 233 between the pages in the set can be identified. The intersection includes the elements on the page which are part of the schema being searched for and the elements which appear in the same relative position on each page which are not part of the schema. A data intersection 233 is created to represent the intersection elements, their relative position to one another, the type of each element, and constants (strings) or markers (shopping cart). Markers (e.g. shopping cart) are symbols or text which appear on every schema page but which are no part of the actual schema or schema information. Markers are found on pages at specific web sites which can be used to identify web pages at that site which contain database records. Also pages with DBR's can contain markers. The markers can be associated with a DBR format at the site and can be used in the probability calculation for subsequent pages at the site, in the data structure intersection which is sent to the extractor generator 230 wherein the extractor is generated.

Figure 3:
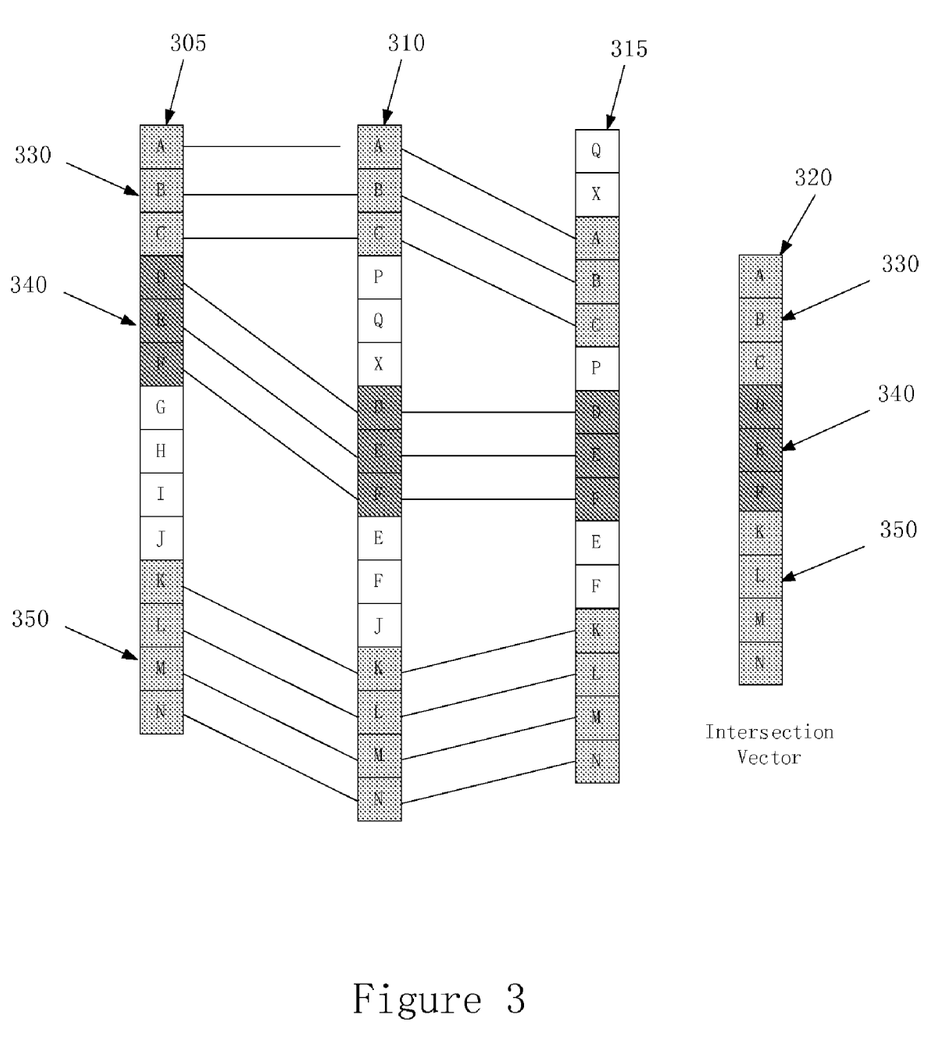
FIG. 3 illustrates extraction of common content from different web pages from a common website using a vector approach in accordance with the present specification.

FIG. 3 illustrates extraction of common content from different web pages from a website using a vector approach. Page vectors 305, 310, and 315 each contains individual or groups of tokens (strings) extracted from web pages from the same root web site. The tokens 330, 340, 350 in the page vectors 305, 310 and 315 are normalized and compared to each other. Common tokens which are markers which appear in 330, 340, 350 which are not part of schemas and which appear on each page are markers. Markers are used to partition the page into smaller parts which are more easily analyzed during the extractor generation process by the extractor generator 130 during the page intersection calculation.

Makers are used to indicate the relative positioning of a schema or DBR's on web pages at the same site which are generated from an automatic schema or database report generator. The intersection of the schemas or DBR's on the different pages is determined by comparing the pages and finding the common elements in the page. The common elements consist of markers, schema names, and/or database field names and database field values. String comparison is used to find markers, schema names, and database field names in different pages. The position of the markers and database field names or schema names is indicated in each data structure which is used to represent the web page. An intersection data structure 320 is created to represent the relative positioning of each common element, the type of the common element, and any specific information about the element such as the name of the DBR field. Additional analysis beyond string comparison is required in order to identify DBR fields and/or schema variable fields which appear on each page in the same relative position.

The intersection data structure 320 can be used to automatically generate an extractor which is specific to the web site and that schema type on the web site. The web site is then crawled and the extractor which is specific to the site and that schema type on the site is then used to extract the information in the schema and the extracted schema information is then used to create a replicate of the web sites schema information. This process is repeated for each site that is identified as a potential schema site. Generating an extractor which knows the relative schema order of a specific schema order from pages on a specific site and then using that extractor to extract the schema from all pages with the same relative schema is much more efficient and results in greater accuracy than using the same extractor which looks for schema elements but does not know the field order for the schema on each site.

The above described process information categorization and extraction can be automatic and is thus more efficient than a general search process. The site/page schema extractor keeps track of the relative position and type of each of the schema elements on a page. The page information is converted into a data structure which the extractor searches in order for the schema elements. As each schema element is encountered then extractor is able to extract the element. The page data structure is consumed in order. Tokens on the page may be grouped together and subjected to further analysis to segment sub groups in the group of tokens. The sub groups are then each assigned a type and the extractor can then extract the information from the relevant sub groups. However, the extractor extracts the fields in order. The extractor does not need to determine the field order in each page's schema on the site. Either the schema on the page matches an existing extractor for the site or the page is added to a new candidate page list for the site. If the page matches an existing extractor then the schema element order on the page is known and the extractor looks for the schema elements in a particular order. The fact that the schema is known for the page saves computation time since schema elements are searched in order. In some cases schema element look ahead is required in order to identify elements. Certain elements may be difficult to identify by themselves. By identifying the next n elements the search space for the difficult to identify element is narrowed. Narrowing the search space for the extractor reduces the extractor's computation time. Searching the page for schema elements in a known order on a page and reducing the search space results in a more efficient extractor by reducing the amount of computations required to find the DBR on the page.

The word type list consist of marker, string database field name or value), proper name (database field value), regular expressions (e.g. alphanumeric text), character symbols ($) marker strings/gifs (shopping cart). The type is used to classify each word on a web page that is interesting. Uninteresting data is thrown away. The word type information is used during the quick classification of the web pages during the candidate page identification crawl. A priority weight is assigned to each word or group of words in the data structure. Database search field name and field value pair list is defined using the type information and specific corresponding regular expressions. The field names are optional because they may or may not be present in the automatically generated pages. Proper name dictionaries are seeded with information to assist in the identification of database field names and web sites which contain database records. The candidate page set is the set of pages which are analyzed and which are then used to create the intersection data structure. Common database field name dictionaries and hashes for aliases are seeded with information to assist in the identification. The retail aggregate database 280 holds the schema which is extracted from each page and site and is combined with similar data from different sites.

Referring back to FIG. 2, the smart crawler 200 crawls the WWW 210. Web pages are found and automatically generated by a database report generator. The web pages are identified and analyzed using DBR probability analysis. Different words in web pages are assigned with different types. Words in web pages are identified to match database search field names. The weighted average of the identified words in the identified word list are computed. A further weighting is added to each word using use proximity search. A proximity search identifies words in web pages which match or are aliases of the priority weighted database search field name and field. Words/phrases around the high priority words and phrases are used to match between the database field name or field value in the database search list. After the extractor generation phase an upper bound on the distance from each high priority word/phrase is given to the next word/phrase in the candidate DBR. Distances which exceed the upper bound are given a lower weighting hence lowering the database record probability for the page. The priority weighted element list is used in a string segmentation process. The higher priority elements are easier to identify and help to find the points in sub strings on the page which can be segmented into words and phrases which match database record field names and field values. A set of pages are identified that have a high probability that they match the schema being searched for. The intersection between the pages is computed and saved in the intersection in a data structure. An extractor for the schema is created using the data structure to create on the candidate page type on that web site in the DBR extractor generator 230. The web site is crawled by the web site crawler 240 using the schema to extract the information stored in the schema on each page on the site which contains the schema. The information extracted is aggregated from the site with the same type of schema information from other sites.

It is understood that the disclosed systems and methods are compatible with other configurations of web site crawler, web site extraction, morphological analyzer, data structural comparison and identification, data base templates and structures without deviating from the spirit of the present specification.

What is claimed is:

1. A computer-implemented method for extracting product information displayed on a plurality of web pages on a first remote web site representing a first database and storing said product information in a second database, comprising:

requesting and, in response to said request, receiving said plurality of web pages related to one or more products from said first remote website;

automatically identifying a first cluster of web pages associated with said first remote web site that comprises product information from said first database, said product information displayed as data field values (DFVs) related to the one or more products and exhibiting common identification characteristics in each web page of said first cluster of web pages;

structurally comparing a first sample of web pages within said first cluster of web pages and creating an intersection data structure comprising the structural location of said DFVs of database records (DBRs), and inferring data field names (DFNs) associated with keywords, symbols, or patterns, indicating the location of said DFVs in said intersection data structure;

automatically deriving a first extraction template from said intersection data structure associated with said first sample of web pages within said first cluster of web pages;

utilizing said first extraction template for extracting said DFVs from said first cluster of web pages to create, in association with said inferred DFNs, extracted DBRs;

and storing said extracted DBRs in said second database.

2. The method of claim 1, wherein inferring the DFNs include determining a common group of DFVs based on a common relative position of the DFVs in each web page of the first sample of web pages.

3. The method of claim 1, wherein inferring the DFNs include identifying a semantic type associated with each DFV in each web page of the first sample of web pages.

4. The method of claim 1, wherein inferring the DFNs associated with a common group of DFVs which are product values spanning the first cluster of web pages on a web page from the first cluster of web pages from the first remote web site includes correlating a DFN, from a reference database of verified DBRs from second remote web site which contain DFNs and DFVs.

5. The method of claim 1, wherein deriving the first extraction template includes finding an intersection data structure that represents an order of relative positioning across the first sample of web pages.

6. The method of claim 5, wherein finding the intersection includes representing a source code associated with a web page as a data structure to allow a comparison of the order of markup tags, key words, symbols, image links and markers.

7. The method of claim 1, wherein the second database is populated with product information extracted from a plurality of web pages generated from a plurality of databases and displayed on a plurality of remote web sites, where the product information is extracted with an extraction template specific to each remote web site.

8. The method of claim 7, wherein product information extracted from one of the plurality of databases can be used to enhance and verify product information extracted from the first database.

9. The method of claim 1, further comprising:
structurally comparing a second sample of web pages within a second cluster of web pages from the first remote web site and automatically deriving from an intersection of common identification characteristics a second extraction template,
wherein the second cluster of web pages is structurally distinct from the first cluster of web pages.

10. The method of claim 1, further comprising:
structurally comparing a third sample of web pages within a third cluster of web pages from a second remote web site and automatically deriving a third extraction template,
wherein a second extraction template using a second sample of web pages from a second cluster of web pages from the first remote web site has been derived, and the third cluster of web pages is structurally distinct from the first cluster of structured web pages.

11. The method of claim 10, wherein the second remote web site is associated with a dealer or authorized reseller related to products of the first remote web site, and DFVs extracted from the second remote web site can be used to verify the first extraction template and DFVs extracted from the first remote web site.

12. The method of claim 1, wherein populating the second database includes normalizing the DFNs to reduce duplicate product information.

13. The method of claim 1, further comprising:
displaying search results from the second database responsive to a user query.

14. The method of claim 13, wherein displaying search results includes displaying a table which compares and sorts different products based on a criteria.

15. The method of claim 13, wherein displaying search results includes displaying aggregated product information for a product, the aggregated product information being sourced from different web pages or different remote web sites.

16. The method of claim 1, wherein the first cluster of web pages from the first remote web site are automatically created from product information stored in the first database by a database report generator.

17. The method of claim 1, wherein identifying the first cluster of web pages includes finding structurally similar pages that contain markup tags, keywords and semantic types, and image links in the same relative order, and finding structurally similar pages that contain DFVs type information.

\* \* \* \* \*